United States Patent
Tallent et al.

(10) Patent No.: US 10,457,121 B2
(45) Date of Patent: Oct. 29, 2019

(54) ENCAPSULATED FIXED WINDOW MODULE FOR A MOTOR VEHICLE

(71) Applicant: HUTCHINSON SEALING SYSTEMS, Auburn Hills, MI (US)

(72) Inventors: Jack Tallent, Farmington Hills, MI (US); Phil Park, West Bloomfield, MI (US)

(73) Assignee: HUTCHINSON SEALING SYSTEMS, Auburn Hills, MI (US)

( * ) Notice: Subject to any disclaimer, the term of this patent is extended or adjusted under 35 U.S.C. 154(b) by 88 days.

(21) Appl. No.: 15/701,276

(22) Filed: Sep. 11, 2017

(65) Prior Publication Data
US 2019/0077230 A1    Mar. 14, 2019

(51) Int. Cl.
*B60J 1/00*  (2006.01)
*B60J 1/10*  (2006.01)
*B60J 10/70* (2016.01)

(52) U.S. Cl.
CPC .............. *B60J 1/007* (2013.01); *B60J 1/10* (2013.01); *B60J 10/70* (2016.02)

(58) Field of Classification Search
CPC .............. B60J 1/007; B60J 1/10; B60J 10/70
See application file for complete search history.

(56) References Cited

FOREIGN PATENT DOCUMENTS

WO    WO-2015033202 A1 *  3/2015  .............. B60J 10/30

* cited by examiner

*Primary Examiner* — D Glenn Dayoan
*Assistant Examiner* — Melissa A Black
(74) *Attorney, Agent, or Firm* — Christensen O'Connor Johnson Kindness PLLC

(57) ABSTRACT

An encapsulated fixed window module for a motor vehicle is disclosed. The module includes a fixed window pane having an exterior surface, an interior surface, and a peripheral edge extending between the exterior and interior surfaces. The module also includes an overmolded trim strip extending along at least a portion of the peripheral edge, the overmolded trim strip having an exterior edge, an interior edge, and peripheral edges extending between the exterior and interior edges. One of the peripheral edges of the overmolded trim strip covers at least in part the peripheral edge of the fixed window pane. The module further includes an esthetic component covering at least a portion of the exterior edge and extending along at least a portion of the overmolded trim strip, the esthetic component having an esthetic exterior face. The at least one of the exterior edge and the esthetic exterior face can be substantially coplanar with the exterior surface.

20 Claims, 4 Drawing Sheets

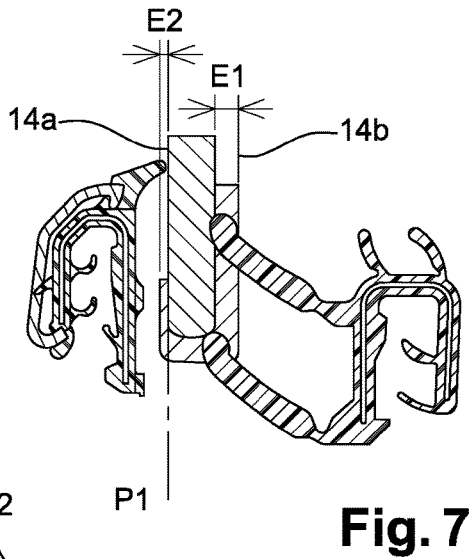
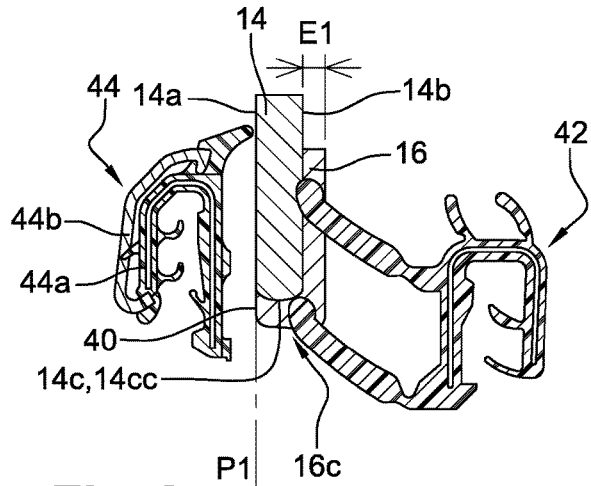
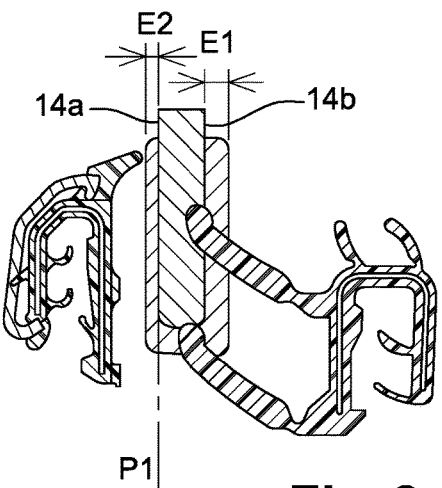
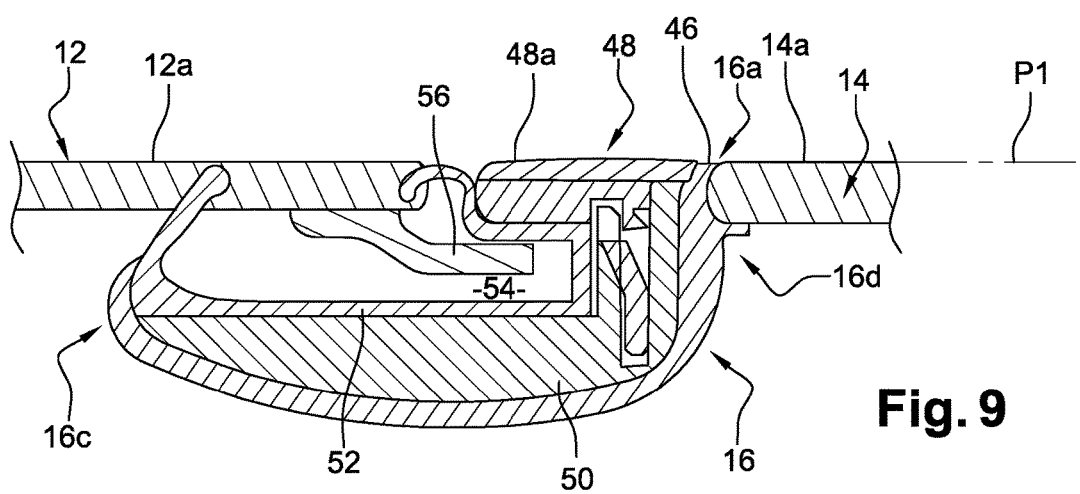

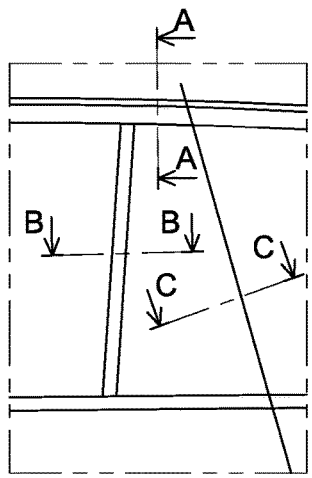
Fig. 10
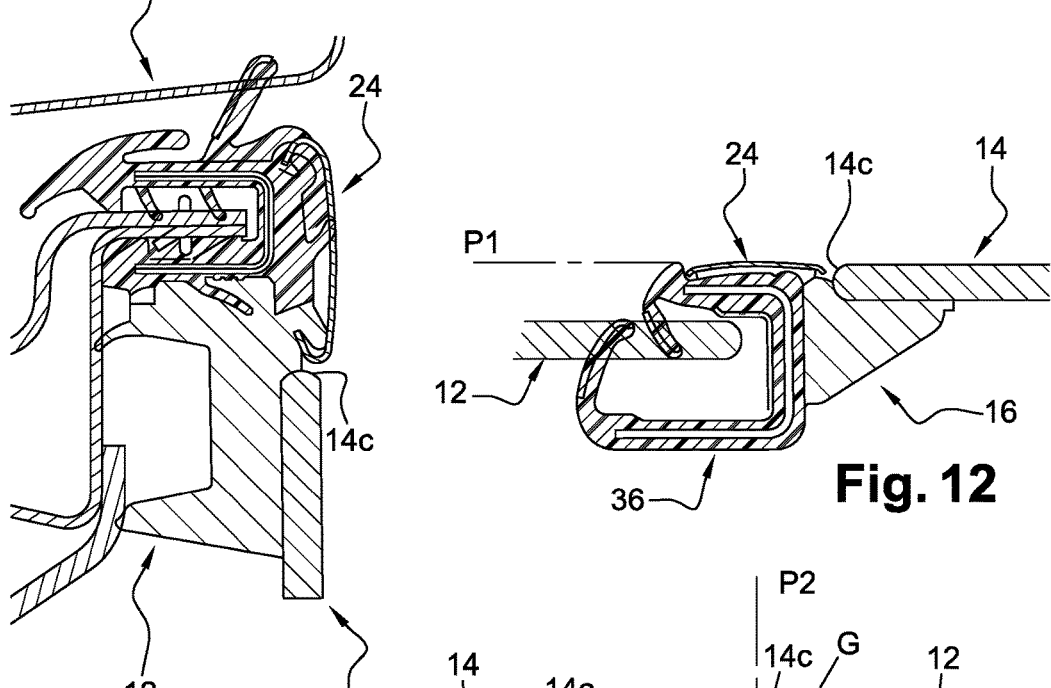
Fig. 11
Fig. 12
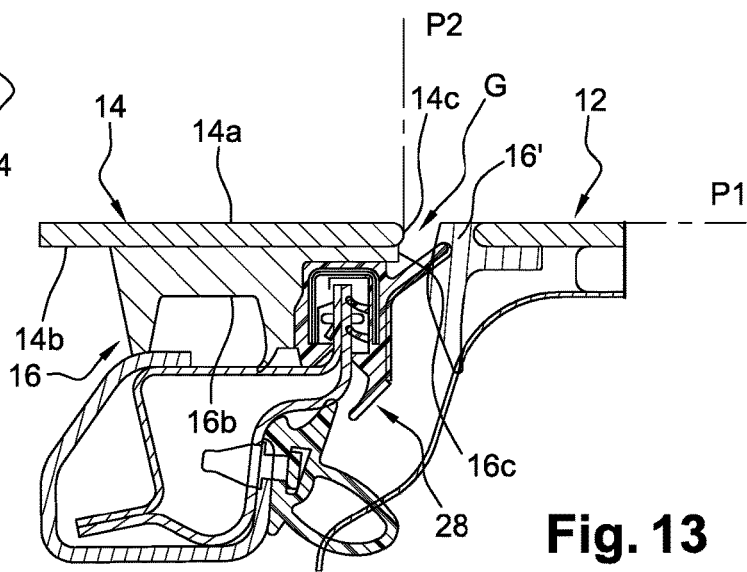
Fig. 13

ENCAPSULATED FIXED WINDOW MODULE FOR A MOTOR VEHICLE

FIELD OF THE DISCLOSURE

Embodiments of the present disclosure relate generally to an encapsulated fixed window module for a motor vehicle and such a motor vehicle.

BACKGROUND

In a number of motor vehicles, a door assembly is designed such that there is a first, e.g. forward, window opening that carries a mobile window pane and a second, e.g. rearward, opening that is equipped with a fixed window pane. Rear fixed windows of conventional design may be assembled from discrete elements that include the window panel, a rear post that serves as a track for an adjacent movable window and various configurations of moldings or trim pieces, most specifically an extruded header/B-pillar trim piece that may be mechanically attached to the window module assembly using an interlocking channel or the like.

The trim in some prior art designs comprises an article in the nature of a pre-formed resilient band. In those designs, the window is inserted into a channel of the trim band which resiliently engages the window pane, but often less than securely. Conventional designs suffer from a number of deficiencies due to their assembly from discrete components such as water leakage, noise from the exterior (wind noise) or the interior, and problems generally with fit and finish. In addition, the assembly of these modules is often difficult, particularly where the individual components are manufactured by more than one supplier.

A few of the problems of conventional designs are overcome through the use of overmolding processes by which a portion of the trim surrounding the window pane is fabricated by encapsulating the window periphery with a polymer using injection molding techniques. In essence, the window pane is placed in a mold cavity which is configured to produce a circumferential trim at the pane edges. The edges of the pane on which the injection molded trim will adhere are cleaned and primed to promote adhesion and to create a water-impervious seal in the formed article. The mold is then closed and the material is injected such that the window pane edges are encapsulated to form the desired trim geometry.

The exterior appearance of the window modules is very important for the customer, i.e., the user of the motor vehicle. A solution for enhancing the appearance of a window module is to provide the periphery of the window pane with finished panels which are located outside the motor vehicle and are visible by the user. Said finished panels are for instance esthetic metal components which are secured to the window module.

It is also known to enhance the esthetic appearance of a window module by lying flush the outside of its window pane with the outside of the structure surrounding this pane. However, prior art only teaches solutions for mobile window modules and panes. Said solutions cannot be used as such for a fixed window module since the structure surrounding such module is different from the one of a mobile window module.

Thus, there is a need in the art for a fixed window module having a pleasant exterior appearance. There is also a need to limit noise transmission through the window module and to simplify the tooling and assembly process.

SUMMARY

Embodiments of the present disclosure aim to provide at least a fixed window module which meets at least in part this need.

According to an embodiment, there is provided an encapsulated fixed window module for a motor vehicle, comprising:

a fixed window pane having an exterior surface, an interior surface, and a peripheral edge extending between the exterior and interior surfaces, an overmolded trim strip extending along at least a portion of the peripheral edge, the overmolded trim strip having an exterior edge, an interior edge, and peripheral edges extending between the exterior and interior edges, at least in a peripheral region of the fixed window pane, one of the peripheral edges of the overmolded trim strip at least in part the peripheral edge of the fixed window pane, and at least in a peripheral region of the fixed window pane, an esthetic component covering at least a portion of the exterior edge and extending along at least a portion of the overmolded trim strip, the esthetic component having an esthetic exterior face, wherein, at least in a peripheral region of the fixed window pane, at least one of the exterior edge and the esthetic exterior face is substantially coplanar with the exterior surface.

In the present specification, the words "inner", "inside", "interior", etc., make reference to the inside of a motor vehicle. The words "outer" "outside", "exterior", etc., make reference to the outside of the motor vehicle. Then, an outer element is located at the outer side of the vehicle. A first outer element, portion or surface may be visible by a user of the motor vehicle or may be hidden by a second outer element, portion or surface covering said first outer element.

Embodiments of the present disclosure provide a solution for enhancing the esthetic appearance of a fixed window module. The exterior edge of the overmolded trim strip and/or the esthetic exterior face of the esthetic component is/are substantially coplanar with the exterior surface of the fixed window pane, which means that the exterior edge and/or the esthetic exterior face lie(s) flush with the exterior surface. In other words, they lie in one plane. In a particular embodiment, such "flush" may be considered as provided by the repositioning of the window pane outward compared to existing solutions. The "flush" solution may improve the sealing condition, reduce passenger cabin noise and provide a pleasant smooth finish.

The encapsulated fixed window module according to embodiments of the disclosure may comprise one or more of the following features, taken alone from each other or in combination with each other:

- the exterior edge includes at least one outer face which is substantially coplanar with the exterior surface,
- at least a portion of the outer face is covered by the esthetic component,
- the exterior edge includes a rib which extends along at least a portion of the peripheral edge of the fixed window pane and which protrudes from a plane including the exterior surface,
- the esthetic component is secured onto the exterior edge,
- the esthetic component covers a portion of the interior surface, the esthetic component has a thickness onto the interior surface which is greater than its thickness onto the exterior surface, the thicknesses being measured in a direction substantially perpendicular to the interior and exterior surfaces, the encapsulated fixed window module further comprises at least one rail having a channel adapted to receive a movable window pane or a rabbet of a door frame, the rail is a guiding and/or mounting rail, the rail includes an outer edge and an inner edge, the outer edges of the rail and of the overmolded trim strip being substantially coplanar, the rail has a U shaped cross section, the fixed window pane has a polygonal shape, its peripheral edge including at least three or four longitudinal segments, and the overmolded trim strip extends along the whole peripheral edge of the fixed window pane, the esthetic component is an extruded component, a molding component, an applique, a post applied component, a vehicle body side, a matting component, etc, at least in a peripheral region of the fixed window pane, the overmolded trim strip covers only the interior surface and one of its peripheral edges extends along the peripheral edge of the fixed window pane and is substantially aligned with this peripheral edge in a plane substantially perpendicular to the fixed window pane, a mounting rail is secured to the interior edge, the mounting rail includes a sealing lip suitable to extend along and in front of the peripheral edge of the overmolded trim strip and to cooperate with an adjacent pane or trim strip secured thereto.

Embodiments of the present disclosure further propose a motor vehicle, comprising at least one encapsulated fixed window module as defined above. The motor vehicle may comprise a door including a door frame, a mobile window pane, and the encapsulated fixed window module, the mobile window pane having an exterior surface, an interior surface, and a peripheral edge extending between the exterior and interior surfaces, wherein the exterior surfaces of the encapsulated fixed window module and of the mobile window pane are substantially coplanar.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein:

FIG. 6 is a cross sectional view along line C-C of FIG. 1;

FIGS. 7 and 8 are cross sectional views similar to FIG. 6 and showing further embodiments;

FIG. 9 is a cross sectional view similar to FIG. 5 and showing another embodiment of an encapsulated fixed window module according to an aspect of the disclosure;

FIG. 10 is a fragmentary plan view of another encapsulated fixed window module according to an aspect of the disclosure;

FIG. 11 is a cross sectional view along line A-A of FIG. 10;

FIG. 12 is a cross sectional view along line B-B of FIG. 10; and

FIG. 13 is a cross sectional view along line C-C of FIG. 10.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

Figure 1:
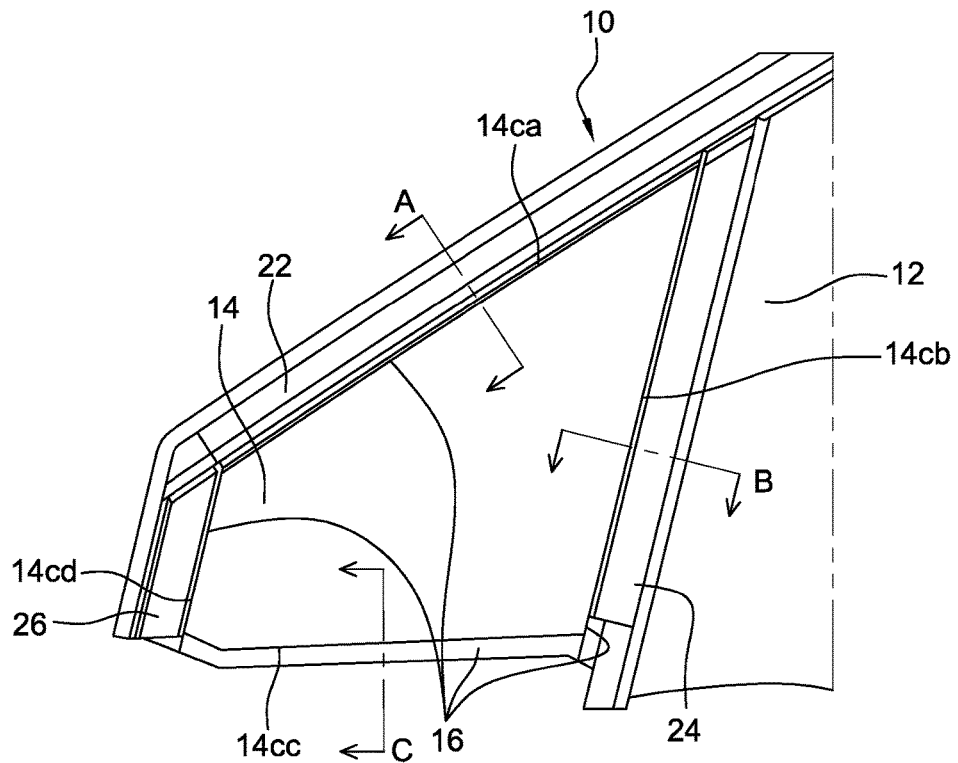
FIG. 1 is a fragmentary plan view of one embodiment of an encapsulated fixed window module according to an aspect of the present disclosure.

FIG. 1 depicts an embodiment of an encapsulated fixed window module 10 for a motor vehicle according to an aspect of the disclosure. As shown in FIG. 1, a motor vehicle door comprises a door frame provided with an encapsulated fixed window module 10 which can be adjacent to a mobile window pane 12. In the embodiment of FIG. 1, the pane 12 is a rearward pane and the module 10 is a forward module.

Figure 2:
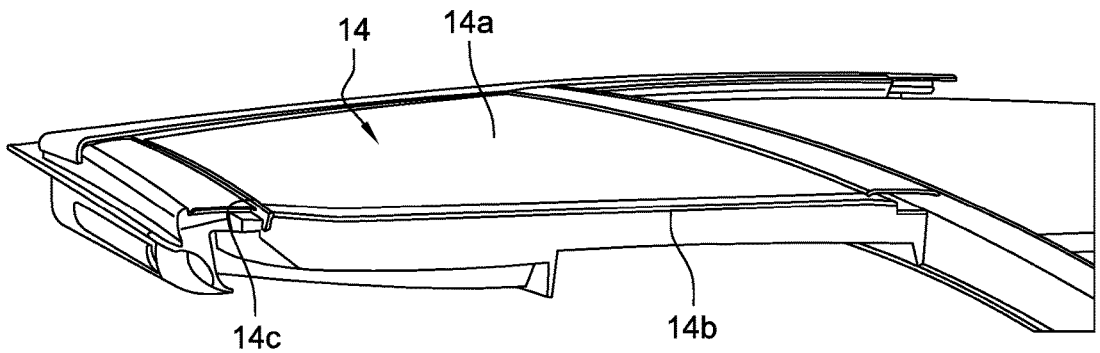
FIG. 2 is a fragmentary and sectional view of an encapsulated fixed window module of FIG. 1.
Figure 3:
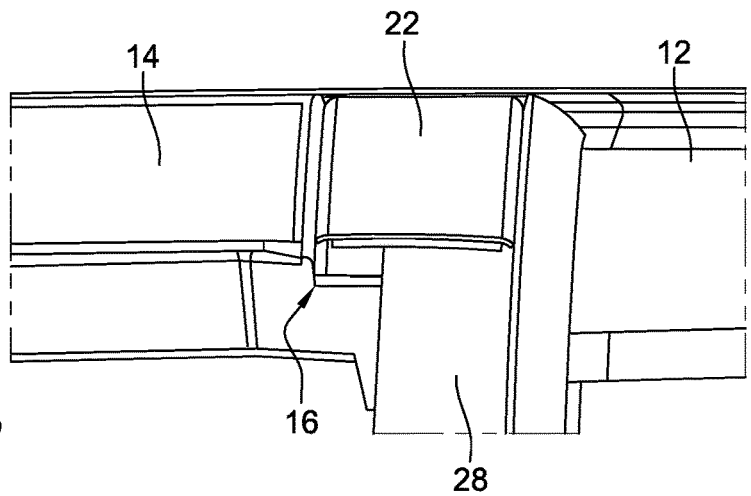
FIG. 3 is a detail view of FIG. 1 on a larger scale.
Figure 4:
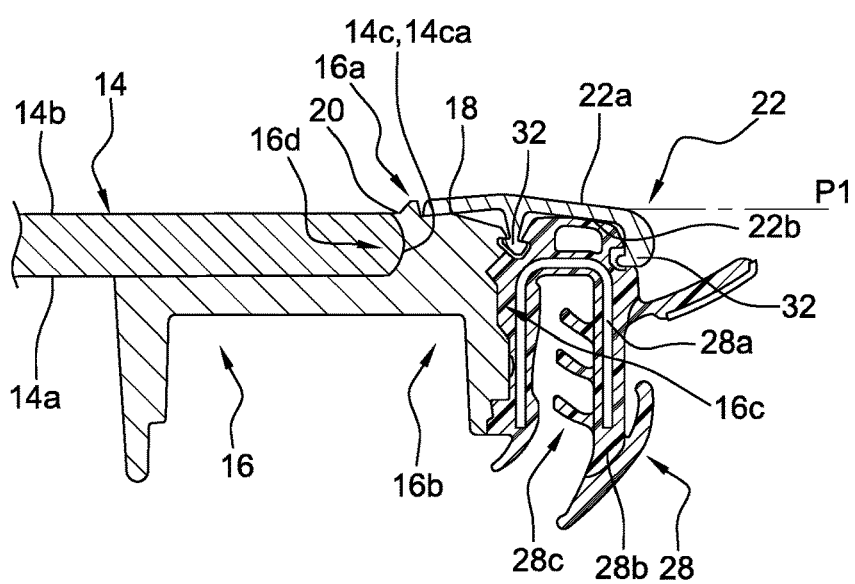
FIG. 4 is a cross sectional view along line A-A of FIG. 1.
Figure 5:
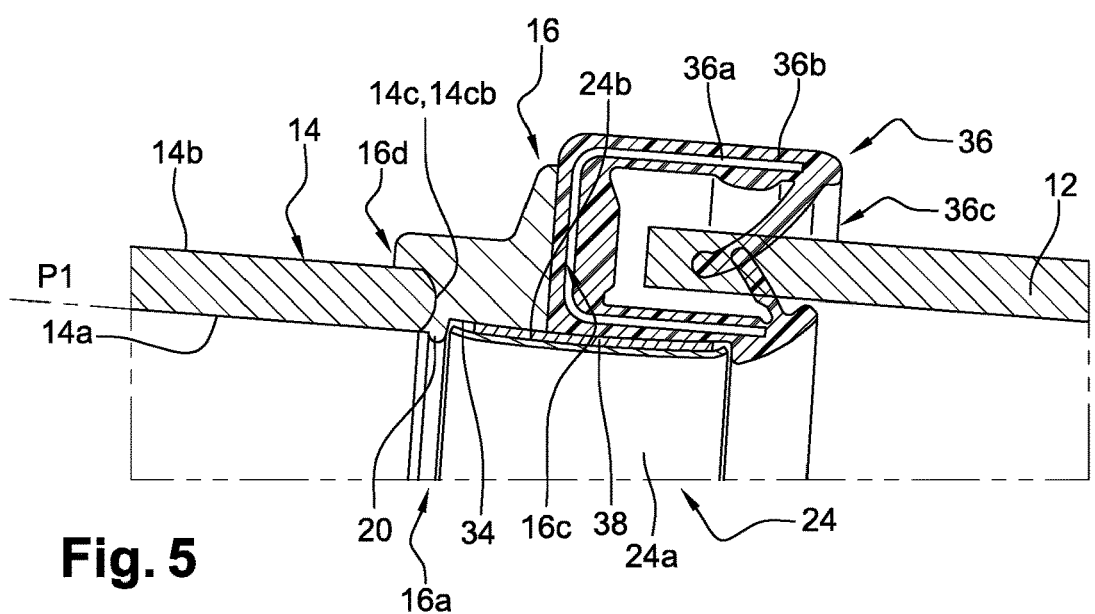
FIG. 5 is a cross sectional view along line B-B of FIG. 1.

The module 10 includes at least a fixed window pane 14 and an overmolded trim strip 16. As shown in FIG. 2, the pane 14 has an exterior surface 14a intended to be located outside the motor vehicle, an interior surface 14b intended to be located inside the motor vehicle, and a peripheral edge 14c extending between the exterior and interior surfaces (see also FIG. 4). The pane 14 may be substantially flat. Thus, its surfaces 14a, 14b may be substantially flat. Of course, the pane 14 and its surfaces may be slightly curved according to the expected design of the module. As shown in FIGS. 4 and 5, the peripheral edge 14c may have a cross sectional convex shape.

In the embodiment shown, the pane 14 has a polygonal shape and comprises three or four longitudinal edges. Its peripheral edge 14c includes therefore a top edge 14ca, a rear edge 14cb, a bottom edge 14cc and a front edge 14cd (see FIG. 1).

FIGS. 4 to 6 are cross sectional views respectively at the top, rear and bottom edges 14ca, 14cb and 14cc. These FIGURES show that the trim strip 16 extends along the edges 14ca, 14cb and 14cc of the pane 14. The trim strip 16 further extends along the front edge 14cd of the pane 14 as shown in FIG. 1. Thus, the trim strip 16 extends along the whole peripheral edge of the pane 14 in the embodiment shown. The trim strip encapsulates the circumferential edges of the fixed window pane and is thus an encapsulated trim. The trim strip 16 comprises therefore segments each extending along the longitudinal edges of the pane 14. Each segment of the trim strip has a length and a width, its length being greater than its width and extending along the longitudinal edges of the pane 14.

The trim strip 16 has an exterior edge 16a, an interior edge 16b, and a peripheral edges 16c, 16d extending between the exterior and interior edges. The peripheral edge 16d extends along the peripheral edge 14c, in close relationship therewith. The peripheral edges 16c, 16d are located on opposite sides.

As far as FIG. 4 and the top edge 14ca of the pane are concerned, the exterior edge 16a of the trim strip includes an outer face 18 which is substantially coplanar with the exterior surface 14a. Outer face 18 and exterior surface 14a extends in a same plane P1. The outer face 18 may be flat or slightly curved as depicted in FIG. 4. The outer face 18 is therefore at least in part located in the plane P1, in particular in the vicinity of the pane 14 and along the corresponding edge 14ca of the pane.

The exterior edge 16a of the trim strip 16 further comprises a longitudinal rib 20. The rib 20 protrudes from the plane P1. The rib 20 extends along the edge 14ca of the pane and is located closed to the pane and in particular to its exterior surface 14a. The rib 20 extends between the pane 14, from one side, and the outer face 18, from the other side, as shown in FIG. 4.

The module 10 further comprises esthetic components 22, 24, 26 and rails 28, 30. Each component and rail may have an elongated shape extending in most of the cases along a segment of the trim strip 16.

Still referring to FIG. 4 and the top edge 14ca of the pane 14, the peripheral edge 16c of the trim strip 16 is secured to a mounting rail 28. This rail 28 is U-shaped and includes a U-shaped post 28a embedded into a polymeric covering 28b. The rail 28 includes an opening 28c which is oriented toward the inner side, in a direction substantially perpendicular to the plane P1.

The mounting rail 28 allows securing the module 10 onto a door frame rebate (not shown) which is intended to be inserted into the opening 28c. The covering 28b may include sealing lips suitable to cooperate with the rebate or other portions of the door frame. The mounting rail 28 may be secured to the trim strip 16 during overmolding, a cavity of a mold being suitable to receive the peripheral edge 14c, 14ca of the pane 14, the mounting rail 28 and the material to be injected.

The peripheral edge 16d of the trim strip covers the entire peripheral edge 14c, 14ca of the pane and extends also onto a portion of its interior surface 14b.

Lastly, as shown in FIG. 4, a first esthetic component 22 is secured onto the trim strip 16 and the mounting rail 28. The component 22 includes an esthetic exterior face 22a and an interior face 22b. The component 22 includes a flat portion including the faces 22a, 22b and hooks 32 extending inward from the inner face 22b. The hooks 32 are used to mechanically secure the component 22 onto the trim strip 16 and the mounting rail 28, the trim strip 16 and the mounting rail 28 including grooves intended to receive the hooks 32 by snap fitting.

The component 22 and in particular its flat portion is intended to cover a portion of the exterior edge 16a of the trim strip 16, and extends along the top edge 14ca. As shown in FIG. 4, the exterior surface 22a is substantially parallel to plane P1 and slightly remote from it, outward, in particular in the vicinity of the pane 14.

Advantageously, in some embodiments, the rib 20 which extends along an edge of the component 22 may have many functions. A first function of positioning the component 22 during mounting and a second function of sealing any gap between the outer face 18 and the inner face 22b of the component 22 after mounting. The rib further has an aerodynamic function by deviating air flowing on the exterior surface of the module. The air is deviating and does not pass under the component. Noise and vibrations are thus avoided.

Referring now to FIG. 5 and the rear edge 14cb of the pane, the exterior edge 16a of the trim strip includes an outer face 34 which is substantially parallel to the plane P1 and which is slightly remote inward from this plane P1. P1 of FIGS. 4 and 5 is the same if the pane 14 is flat. In case where it would be curved, P1 of FIGS. 4 and 5 might be slightly different. In each case, P1 is considered as a plane including the exterior surface 14a of the plane, in the vicinity of one of its peripheral edges. The outer face 34 may be flat or slightly curved as depicted in FIG. 5.

The exterior edge 16a of the trim strip 16 further comprises a longitudinal rib 20. The rib 20 protrudes from the plane P1. The rib 20 extends along the edge 14cb of the pane and is located closed to the pane and in particular to its exterior surface 14a. The rib 20 extends between the pane 14, from one side, and the outer face 34, from the other side, as shown in FIG. 5.

The peripheral edge 16c of the trim strip 16 is secured to a guiding rail 36. This rail 36 is U-shaped and includes a U-shaped post 36a embedded into a polymeric covering 36b. The rail 36 includes an opening 36c which is oriented toward the rear side, in a direction substantially parallel to the plane P1. The guiding rail 36 allows guiding the mobile window pane 12 which is intended to slide into the opening 36c. The covering 36b may include sealing lips suitable to cooperate with the pane 12.

The mounting rail 36 may be secured to the trim strip 16 during overmolding, a cavity of a mold being suitable to receive the peripheral edge 14c, 14cb of the pane 14, the guiding rail 36 and the material to be injected. The same mold may be used for forming simultaneously the rails 28, 36.

The peripheral edge 16d of the trim strip covers the entire peripheral edge 14c, 14cb of the pane and extends also onto a portion of its interior surface 14b.

A second esthetic component 24 is secured onto the trim strip 16 and the guiding rail 36. The component 24 is flat and includes an esthetic exterior face 24a and an interior face 24b. The component 24 is intended to cover a portion of the exterior edge 16a of the trim strip 16, and extends along the top edge 14cb. The component 24 is secured by means of an adhesive tape 38 interposed between the interior face 24b, at one side, and the exterior edge 16a and the guiding rail 36, at the other side. As shown in FIG. 5, the exterior surface 24a is substantially coplanar with the exterior surface 14a and extends therefore into plane P1

Advantageously, in some embodiments, the rib 20 which extends along an edge of the component 24 may have many functions. A first function of positioning the component 24 during mounting and a second function of sealing any gap between the outer face 34 and the inner face 24b of the component 24 after mounting. The rib further has an aerodynamic function by deviating air flowing on the exterior surface of the module. The air is deviating and does not pass under the component. Noise and vibrations are thus avoided.

Referring now to FIG. 6 and the bottom edge 14cc of the pane, the exterior edge 16a of the trim strip includes an outer face 40 which substantially extends into the plane P1. The outer face 40 may be flat or slightly curved as depicted in the FIG. 6. This portion of the trim strip is L-shaped in cross section. One leg of the L shape extends onto the peripheral edge 14c, 14cc of the pane and the other leg extends onto the interior surface 14b of the pane. In the embodiment of FIG. 6, the thickness of the trim strip onto the interior surface 14b is referenced E1. Its thickness onto the exterior surface 14a is null.

In the embodiments of FIGS. 7 and 8, the thickness E1 of the trim strip onto the interior surface 14b is greater than its thickness E2 onto the exterior surface 14a. In these embodiments, the trim strip covers a peripheral portion of the exterior surface 14a. The trim strip extends on a larger surface in FIG. 8 than in FIG. 7.

FIGS. 6 to 8 further show the environment of the bottom edge of the module 10 with an inner mounting rail 42 located inward the module 10 and a finished profile 44 located outward the module. The mounting rail 42 is similar to the mounting rail 28 and includes at least one sealing lip suitable to cooperate with the trim strip 16 and in particular its leg extending onto the interior surface 14b.

The finished profile 44 includes a mounting rail 44a and an esthetic component 44b. The rail 44a is similar to the mounting rail 28 and includes at least one sealing lip suitable to cooperate with the exterior surface 14a and/or the trim strip 16 (and in particular its leg extending onto the exterior surface 14a in the embodiment of FIG. 8). The esthetic component 44b may be secured to the rail 44a by snap fitting. This esthetic component is advantageously configured for hiding the trim strip 16 by covering it along the bottom edge 14cc.

Thus, in the embodiments of FIGS. 6-8, the trim strip 16 lies flush with the exterior surface 14a of the pane 14 or has a small thickness onto this surface. This allows reducing the gap between the exterior surface 14a and the finished profile 44, and therefore simplifying the sealing and design of the finished profile in this area.

FIG. 9 illustrates another embodiment of the present invention in which both the exterior edge 16a (or its outer face 46) of the trim strip 16 and the esthetic exterior face 48a of the component 48 are substantially coplanar with the exterior surface 14a of the pane 14. Moreover, this embodiment shows that the exterior surface 12a of the window pane 12 also lies flush with the window pane 14. Then, plane P1 includes substantially exterior surfaces 12a, 14a, outer face 46, and exterior face 48a.

In the embodiment of FIG. 9, the mounting rail 50 here includes a space into which is received a guiding and sealing profile 52 having a U shape in cross section. This profile 52 comprises an opening 54 which is oriented toward the rear or front side, in a direction substantially parallel to the plane P1. The profile 52 allows guiding the mobile window pane 12 which carries a guiding mean 56 inserted and sliding into the opening 54. The profile 52 may include sealing lips suitable to cooperate with the pane 12.

FIG. 10 depicts another embodiment of an encapsulated fixed window module 10 for a motor vehicle according to an aspect of the disclosure. The above description of the former FIGURES applies at least in part to this embodiment illustrated by FIG. 10 and also FIGS. 11-13 which are cross sectional views respectively at the top, front and rear edges of the module 10.

FIG. 12 is similar to FIG. 5 except that the trim strip 16 does not comprise a rib 20 in the vicinity of the peripheral edge 14c of the pane 14. In this area, the trim strip 16 does not cover this entire peripheral edge 14c of the pane 14.

FIG. 11 is similar to FIG. 4 except that the trim strip 16 does not comprise a rib 20 in the vicinity of the peripheral edge 14c of the pane 14.

FIG. 13 illustrates the rear edge of the module 10. In this area, the trim strip 16 only covers the interior surface 14b of the pane 14. One 16c of the peripheral edges of the trim strip 16 extends along the peripheral edge 14c of the pane 14 and is substantially aligned with this peripheral edge 14c in a plane P2 substantially perpendicular to the pane 14. The peripheral edges 14c and 16c are separated by a gap G from an adjacent fixed or mobile pane 12, or a trim strip 16' attached thereto. A mounting rail 28 is secured to the interior edge 16b of the trim strip 16 and includes a sealing lip extending in the gap G and intended to cooperate with the adjacent pane 12 or trim strip 16'. Both panes 12, 14 have their exterior surfaces aligned in the plane P1. The exterior edge of the trim strip 16' comprises an outer face extending into this plane P1.

The material of the trim strip is for instance EPDM.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure.

The embodiments of the invention in which an exclusive property or privilege is claimed are defined as follows:

1. An encapsulated fixed window module for a motor vehicle, comprising:
   a fixed window pane having an exterior surface, an interior surface, and a peripheral edge extending between said exterior and interior surfaces,
   an overmolded trim strip extending along at least a portion of said peripheral edge, said overmolded trim strip being secured by overmolding onto said at least a portion of said peripheral edge, said overmolded trim strip having an exterior edge, an interior edge, and peripheral edges extending between said exterior and interior edges, at least in a peripheral region of said fixed window pane, one of the peripheral edges of said overmolded trim strip covering at least in part said peripheral edge of said fixed window pane, and
   at least in a peripheral region of said fixed window pane, an esthetic component covering at least a portion of said exterior edge and extending along at least a portion of said overmolded trim strip, said esthetic component having an esthetic exterior face,
   wherein, at least in a peripheral region of said fixed window pane, at least one of said exterior edge and said esthetic exterior face is substantially coplanar with said exterior surface.

2. The encapsulated fixed window module as claimed in claim 1, wherein said exterior edge includes at least one outer face which is substantially coplanar with said exterior surface.

3. The encapsulated fixed window module as claimed in claim 2, wherein at least a portion of said outer face is covered by said esthetic component.

4. The encapsulated fixed window module as claimed in claim 1, wherein said exterior edge includes a rib which extends along at least a portion of said peripheral edge of said fixed window pane and which protrudes from a plane including said exterior surface.

5. The encapsulated fixed window module as claimed in claim 1, wherein said esthetic component is secured onto said exterior edge.

6. The encapsulated fixed window module as claimed in claim 1, wherein said overmolded trim strip covers a portion of said interior surface.

7. The encapsulated fixed window module as claimed in claim 6, wherein said overmolded trim strip has a thickness onto said interior surface which is greater than its thickness onto said exterior surface, said thicknesses being measured in a direction substantially perpendicular to said interior and exterior surfaces.

8. The encapsulated fixed window module as claimed in claim 1, further comprising at least one rail having a channel adapted to receive a movable window pane or a rabbet of a door frame.

9. The encapsulated fixed window module as claimed in claim 8, wherein said rail is a guiding and/or mounting rail.

10. The encapsulated fixed window module as claimed in claim 8, wherein said rail includes an outer edge and an inner edge, said outer edges of said rail and of said overmolded trim strip being substantially coplanar.

11. The encapsulated fixed window module as claimed in claim 8, wherein said rail has a U shaped cross section.

12. The encapsulated fixed window module as claimed in claim 1, wherein said fixed window pane has a polygonal shape, its peripheral edge including at least three or four longitudinal segments.

13. The encapsulated fixed window module as claimed in claim 1, wherein said overmolded trim strip extends along the whole peripheral edge of said fixed window pane.

14. The encapsulated fixed window module as claimed in claim 1, wherein, at least in a peripheral region of said fixed window pane, said overmolded trim strip covers only said interior surface, and one of its peripheral edges extends along said peripheral edge of said fixed window pane and is substantially aligned with this peripheral edge in a plane substantially perpendicular to the fixed window pane.

15. The encapsulated fixed window module as claimed in claim 14, wherein a mounting rail is secured to said interior edge.

16. The encapsulated fixed window module as claimed in claim 15, wherein said mounting rail includes a sealing lip suitable to extend along and in front of said peripheral edge of said overmolded trim strip and to cooperate with an adjacent pane or trim strip secured thereto.

17. A motor vehicle, comprising at least one encapsulated fixed window module as claimed in claim 1.

18. The motor vehicle as claimed in claim 17, which comprises a door including a door frame, a mobile window pane, and said encapsulated fixed window module, said mobile window pane having an exterior surface, an interior surface, and a peripheral edge extending between said exterior and interior surfaces, wherein said exterior surfaces of said encapsulated fixed window module and of said mobile window pane are substantially coplanar.

19. An encapsulated fixed window module for a motor vehicle, comprising:
- a fixed window pane having an exterior surface, an interior surface, and a peripheral edge extending between said exterior and interior surfaces,
- an overmolded trim strip extending along at least a portion of said peripheral edge, said overmolded trim strip having an exterior edge, an interior edge, and peripheral edges extending between said exterior and interior edges, at least in a peripheral region of said fixed window pane, one of the peripheral edges of said overmolded trim strip covering at least in part said peripheral edge of said fixed window pane,
- at least in a peripheral region of said fixed window pane, an esthetic component covering at least a portion of said exterior edge and extending along at least a portion of said overmolded trim strip, said esthetic component having an esthetic exterior face, and
- at least one rail having a channel adapted to receive a movable window pane or a rabbet of a door frame,
- wherein, at least in a peripheral region of said fixed window pane, at least one of said exterior edge and said esthetic exterior face is substantially coplanar with said exterior surface.

20. A motor vehicle, comprising a door including a door frame, a mobile window pane, and an encapsulated fixed window module, said encapsulated fixed window module comprising:
- a fixed window pane having an exterior surface, an interior surface, and a peripheral edge extending between said exterior and interior surfaces,
- an overmolded trim strip extending along at least a portion of said peripheral edge, said overmolded trim strip having an exterior edge, an interior edge, and peripheral edges extending between said exterior and interior edges, at least in a peripheral region of said fixed window pane, one of the peripheral edges of said overmolded trim strip covering at least in part said peripheral edge of said fixed window pane, and
- at least in a peripheral region of said fixed window pane, an esthetic component covering at least a portion of said exterior edge and extending along at least a portion of said overmolded trim strip, said esthetic component having an esthetic exterior face,
- wherein, at least in a peripheral region of said fixed window pane, at least one of said exterior edge and said esthetic exterior face is substantially coplanar with said exterior surface, and
- said mobile window pane having an exterior surface, an interior surface, and a peripheral edge extending between said exterior and interior surfaces, wherein said exterior surfaces of said encapsulated fixed window module and of said mobile window pane are substantially coplanar.

* * * * *